United States Patent [19]

Sane et al.

[11] Patent Number: 5,028,036
[45] Date of Patent: Jul. 2, 1991

[54] FILTER FOR MOLTEN FERROUS METAL

[75] Inventors: Ajit Y. Sane, Medina; Alison W. Gee; David J. Eichenmiller, both of Chesterland, all of Ohio

[73] Assignee: The Carborundum Company, Niagara Falls, N.Y.

[21] Appl. No.: 323,509

[22] Filed: Mar. 14, 1989

Related U.S. Application Data

[63] Continuation-in-part of Ser. No. 879,789, Jun. 27, 1986.

[51] Int. Cl.$^5$ .............................................. B01D 29/01
[52] U.S. Cl. ...................................... 266/227; 75/407; 210/510.1
[58] Field of Search ................... 266/227, 287; 75/45, 75/61, 407; 210/510.1

[56] References Cited

U.S. PATENT DOCUMENTS

| | | | |
|---|---|---|---|
| 3,963,504 | 6/1976 | Lundsager | 106/41 |
| 4,573,664 | 3/1986 | Prendergast | 266/230 |
| 4,667,939 | 5/1987 | Luyckx | 75/59.26 |
| 4,681,624 | 7/1987 | DeAngelis et al. | 266/227 |
| 4,713,180 | 12/1987 | Hofmann et al. | 266/227 |

FOREIGN PATENT DOCUMENTS 58-207318  12/1983  Japan ...................................... 75/45

Primary Examiner—Melvyn J. Andres
Attorney, Agent, or Firm—Weston, Hurd, Fallon, Paisley & Howley

[57] ABSTRACT

The filtration of molten ferrous metal is accomplished by providing a porous ceramic filter preferably comprising particles of alumina and partially stabilized zirconia that are spaced by interconnected cells to form circuitous and tortuous pathways throughout the ceramic body. The filter is a disc-like structure that can have different surface configuration such as corrugations or a waffle design. The filter can be flat-surfaced with an array of cylindrical openings or counterbored openings extending completely through the filter, or with openings extending partially into the filter from the upper and lower sides of the filter. Several relatively thin filters can be arranged in tandem, if desired.

18 Claims, 5 Drawing Sheets

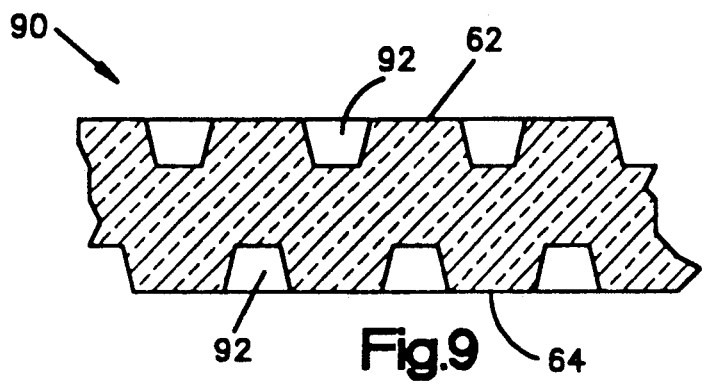
Fig. 9
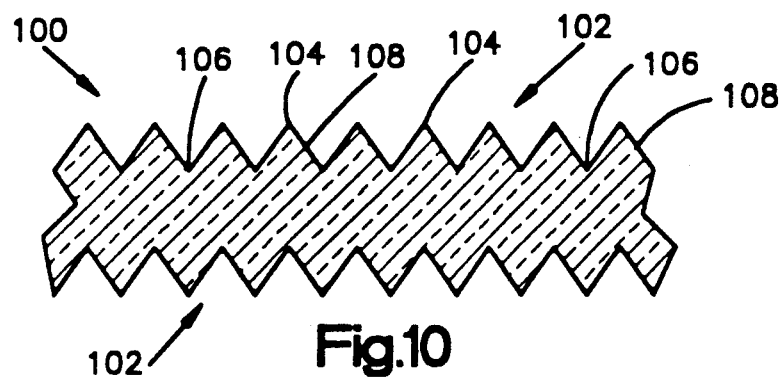
Fig. 10
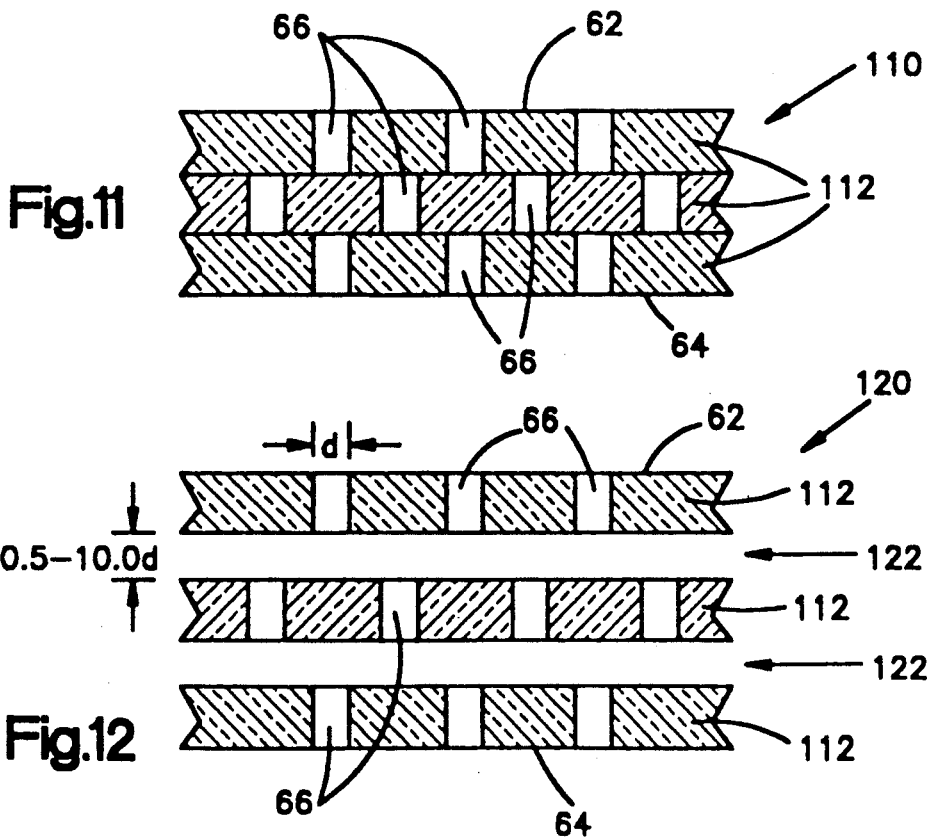
Fig. 11
Fig. 12

FILTER FOR MOLTEN FERROUS METAL

This is a continuation-in-part of application Ser. No. 879,789, filed June 27, 1986, by A. Y. Sane et al., entitled "Molten Metal Filter Medium and Method for Making Same," attorney's docket number 84-P-1116 (hereinafter the "Filter Patent"), the disclosure of which is incorporated herein by reference.

BACKGROUND OF THE INVENTION

1. Field of the Invention

The invention relates generally to the field of filtering contaminants from molten metals and, more particularly, to a technique for separating non-metallic inclusions and contaminants from molten ferrous metal as it is flowed.

2. Description of the Prior Art

A variety of techniques are known for filtering molten metal for various purposes. For example, U.S. Pat. No. 3,981,352, discloses a filter formed by a multiplicity of substantially spherical refractory particles. The particles are held together in a bonded assembly by means of a ceramic binder, the binder substantially coating the particles. Openings are defined between adjoining coated particles to permit a flow of molten metal through the filter. The patent states that the binder is of a type having an affinity for dross and slag constituents in the molten metal whereby the constituents are removed during their passage through the filter.

U.S. Pat. No. 4,007,923 discloses a technique for treating molten aluminum and aluminum alloys to remove solid and gaseous impurities. The metal is flowed through a series of successively arranged purification stages. One of the stages includes a plurality of flat adsorption plates formed of a refractory material that are spaced apart in parallel relation to each other. The molten metal is directed between the plates where impurities in the form of minute particulate matter having an affinity for the material of the plates will adhere to the reactive surfaces of the plates. The '923 patent also discloses a filtration stage employing a porous ceramic filter comprised of small, fused alumina particles that are bonded together with a vitreous material and fired.

U.S. Pat. No. 4,165,235 discloses a technique for in-line degassing and filtration of molten metal, especially aluminum, where a plate-like porous ceramic foam filter is disposed in a horizontal orientation. An array of drilled holes extend completely through the filter. Molten metal flows downwardly through the filter, while fluxing gas is passed upwardly through the filter in countercurrent contact with the molten metal. The '235 patent states that although the holes are substantially larger than the individual pore size of the filter, the fluxing gas flows through the holes while substantially all of the molten metal passes through the filter body. In effect, the holes provide a pressure relief for the fluxing gas.

Despite the teachings of the prior art, certain concerns have not been adequately addressed. One of these concerns relates to the type of metal that can be filtered properly. The '352 patent is stated to be of particular importance with respect to the casting of "super alloys" and titanium, while the '923 and '235 patents are stated to be especially adapted for the treatment of aluminum and aluminum alloys. A particular problem exists, however, with respect to ferrous metals such as steel, stainless steel, and ductile iron. The higher temperatures encountered with molten ferrous metals present severe structural problems with many types of filter materials. Further, deoxidation products and exogenous non-metallic inclusions contained within molten steel before casting can build up on the exposed surfaces of filter materials, thereby plugging the filters or at least reducing their flux substantially. Desirably, a plate-like filter would be available that would stand up to the temperatures encountered in the handling of molten ferrous metals while having good filtration efficiency, a high flux, and while avoiding problems associated with the cake-like build-up of non-metallic inclusions.

An additional problem associated with the filtration of molten ferrous metals is that of freeze-up. Because currently available filters greatly restrict the rate of flow of molten ferrous metal in a casting mold, the filter can act as a heat sink, thereby permitting the metal to freeze within the filter. To a foundry, a casting that has not filled because of premature freezing due to the filter represents losses of time in mold preparation and casting and in electrical costs to melt metal for a replacement casting. Two means of reducing the frequency of filter freeze-up are to increase the super heat of the molten ferrous metal and to preheat the filter in the casting mold. Increasing the super heat of the molten ferrous metal is undesirable to foundry operators because of the considerable resulting increase in power consumption. Preheating a filter while it is in the casting mold is impractical.

In the particular case of steel casting in a foundry, one known filter construction designed for casting molten ferrous metals experienced freeze-up of 30% of all such filters during casting. An even worse problem occurs with ceramic foam filters similar to those disclosed in the '235 patent, for almost 100% of solid body foam filters cause a freeze-up problem. In short, ceramic foam filters heretofore have been difficult to use in the casting of molten ferrous metals. Desirably, a filter would be available for the casting of molten ferrous metals that would eliminate, or substantially eliminate, the freeze-up problem.

SUMMARY OF THE INVENTION

The present invention addresses the foregoing concerns of the prior art and provides a new and improved technique for the filtration of molten ferrous metals. Essentially, a porous ceramic filter body such as that disclosed and claimed in the Filter Patent is provided in the form of a disc-like filter body having upper and lower surfaces. The filter body preferably has a thickness of about 18 mm for typical small foundry castings. The filter body includes openings having a diameter larger than the average pore size of the filter body, or a surface configuration that provides the same effect.

In one embodiment, openings are formed in the upper surface of the filter body, which openings extend through the filter body toward the lower surface a distance within the range of about 50–99% of the distance between the upper and lower surfaces. The openings are laterally spaced from each other so that the structural integrity of the filter body is maintained. In another embodiment, the openings extend completely through the filter body. It also is possible to provide an array of counterbored through openings, the counterbored portions being positioned upstream in the direction of flow of the molten metal. Possible surface configurations include a waffle-type or corrugations.

Another embodiment of the invention includes several disc-like filter bodies that are positioned in tandem. Each of the filter bodies includes openings like those of the embodiments already described. The openings are arranged so that no straight-line continuous opening extends through the assembled filter bodies. The filter bodies can be in contact with each other, or they can be spaced a predetermined distance.

Tests conducted with the present invention indicate that the filter body according to the invention has an improved flux while the freezing of molten metal within the filter surprisingly is prevented. The filter also is more efficient than existing molten ferrous metal filters; it is believed to be more efficient because it apparently attracts inclusions and contaminants from the molten metal by surface interaction between oxide inclusions and the filter surface. Importantly, the filter body according to the invention possesses good strength that withstands the temperatures encountered in filtering molten ferrous metals.

The foregoing, and other features and advantages of the invention, will be apparent from reviewing the remaining portion of the specification, including the claims.

BRIEF DESCRIPTION OF THE DRAWINGS

FIG. 9 is a view similar to FIG. 7, showing an alternate surface configuration;

FIG. 10 is a view similar to FIG. 7, showing a corrugated surface configuration;

FIG. 11 is a view similar to FIG. 7, showing filter bodies according to the invention arranged in tandem; and FIG. 12 is a view similar to FIG. 11 showing the filter bodies spaced apart a predetermined distance.

DESCRIPTION OF THE PREFERRED EMBODIMENT

Figure 1:
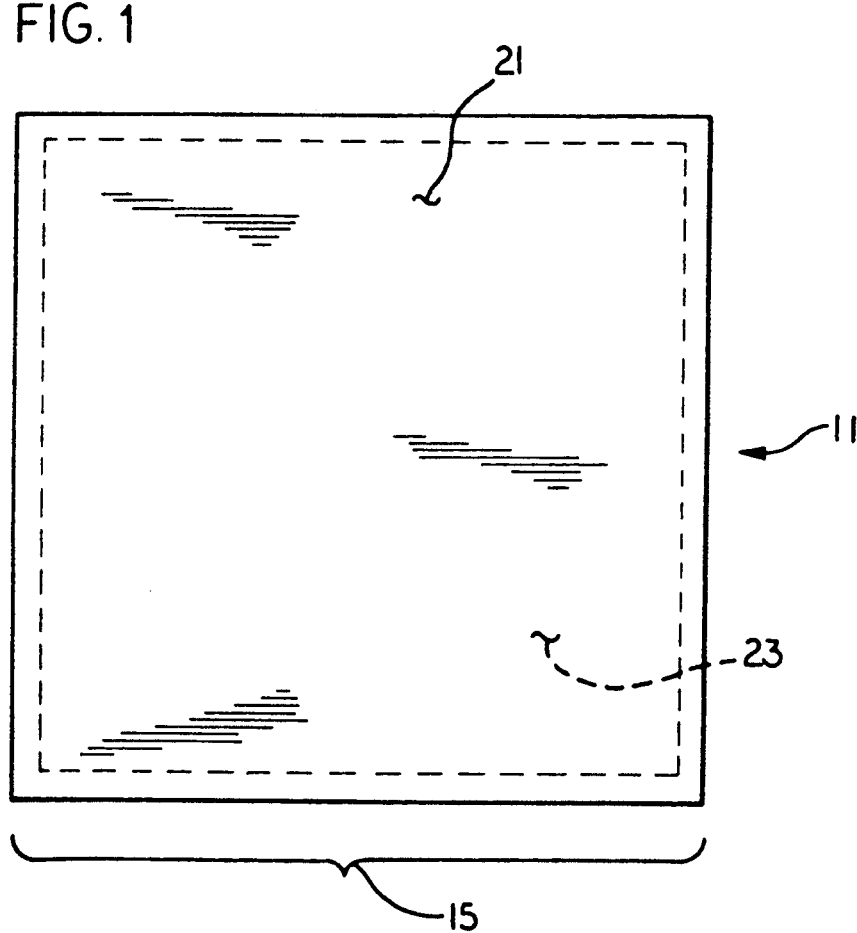
FIG. 1 is a schematic plan view of a molten metal filter formed from a porous ceramic body according to a preferred embodiment of the shape of the present invention.
Figure 2:
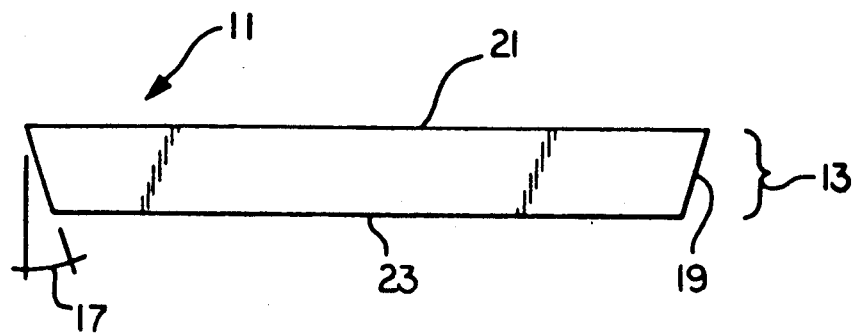
FIG. 2 is a schematic elevational view of the molten metal filter shown in FIG. 1.

Referring to FIGS. 1 and 2, a filter according to the invention is indicated generally by the reference numeral 11. The filter 11 is manufactured according to techniques disclosed in the Filter Patent. As stated in the Filter Patent and as incorporated herein: "The present invention includes a method of making a porous ceramic body as well as the porous ceramic body itself. A quantity of bondable or sinterable ceramic powder, or mixtures of different ceramic powders which will either bond or sinter together, are thoroughly mixed with a polymer binder. A pore former is also mixed with the powder or powders and a polymer binder. The resultant mixture of the constituent components is then consolidated into a relatively dense self-sustaining body. The pore former can be any suitable solid that can be removed by leaching, melting or pyrolysis. The pore former may include therewith a lubricant which is not soluble in the polymer binder and which does not have deleterious effects on the curing of the polymer binder. The pore former, on the other hand, may have inherent self-lubricating properties. Or, alternatively, the resin may by itself, or in combination with other materials, provide lubricity between the pore former surfaces and the resin. The pore former may, also, be deformable under pressing conditions. The polymer binder may be any thermosetting or thermoplastic resin that can be readily mixed with ceramic powder or powders and the pore former, provided that the polymer binder does not dissolve or dilute the lubricant, used in association with the pore former, therein. The self-sustaining body is then consolidated to a shaped size, for example, pressure compaction by die pressing. The polymer binder is then cured. Then the pore former is removed, and the shaped body is elevated to sintering temperature to form a porous sintered ceramic body with cells and interconnecting pores therebetween, in a form which is known in the field of geology as "moldic porosity". The sintered ceramic body has smooth walled cells formed by the pore formers, and pores, with rounded edges, which interconnect the cells, the rounded edges forming the transition points between the cells and the pores. The cell and pore characteristics may be controlled or affected by the deformability, size, distribution and location of the pore formers, and the type, distribution and amount of lubricant means used, and also by the type of consolidation process used, the composition of the sinterable or bondable ceramic powder, or mixture of those ceramic powders, and the type of polymer binder which is used. Either by itself, or in combination with a lubricant, the selected polymer binder should be such that it tends to bead in contact with the surface of the pore former. The ceramic powders, as sintered to form the ceramic body, form a continuous, uninterrupted, void-free and dense sintered ceramic matrix interspersed between the interconnecting voids and pores, which exhibits low friability and low brittleness in regard to physical shock. The porous ceramic body of the present invention is useful for molten metal filtration as well as a variety of other applications, such as, for examples, catalyst supports and gas dispersion mechanisms.

According to the present invention, a sintered or bonded porous ceramic body containing interconnected cells is formed. The cells are interconnected generally in an open cellular-like mode such that circuitous or tortuous pathways are formed through and throughout the ceramic body. The cell sizes may be altered, in either a gradation or abruptly, from one section of the body to another. It is also possible in a given ceramic body, according to the present invention, to form unconnected cells, or no cells at all, in some portions of the body, while other portions contain interconnected cells, thus localizing the pathways through the ceramic body in certain portions or areas thereof, as desired, as will be well understood by those with skill in the field on reading the following description. It is also possible in a given ceramic body, according to the present invention to include a range of sizes and/or shapes of cells such that either the size range is uniformly repeated throughout the ceramic body from one section thereof to another or the cell sizes are randomly arranged and positioned throughout the body.

The ceramic body of the present invention can be formed and shaped, generally, by any conventional method that is applicable to the shaping and forming of sintered ceramic bodies. FIG. 1 schematically shows a preferred form and shape of the ceramic body 11 which is particularly useful in filtering molten metal. FIG. 1 shows a flat plate form of ceramic body 11 in the general shape of a square, however, the shape of this preferred embodiment could be rectangular, round, hexagonal, irregular, etc., depending upon the shape of the holding mechanism (not shown) into which the ceramic body is to be inserted for use. Of course, the sizing of the preferred embodiment of the ceramic body shown in FIG. 1 would be set to correspond to the size of that holding mechanism and to permit ease of insertion and removal in respect thereto.

The thickness 13 of the ceramic body 11 will depend on the holding mechanism, on the one hand, but also could depend on other factors such as the degree of filtration desired, the location of the ceramic body 11 in the filtering apparatus into which it is inserted, the frequency of use thereof, and/or the location and sizing of the interconnected pores throughout the ceramic body 11. Typically, the ceramic body 11 would, for example, have a thickness 13, as shown in FIG. 2, of about 2" (5.1 cm) and, being generally square, would have, for example, equivalent face dimensions 15, nominally, of about 24" (60.7 cm), 20" (50.8 cm), 17" (43.2 cm), 15" (31.8 cm), 12" (30.5 cm), 9" (22.9 cm) or 7" (17.8 cm). The angle of bevel 17, as shown in FIG. 2, is typically, for example, about 17°, however, this also depends on the corresponding segment of the holding mechanism, associated with the filtering apparatus, with which the bevel angle 17 is to be mated.

In operation, the molten metal is preferably gravity flowed, downwardly, through the ceramic body 11, from entry face 21 to exit face 23, as shown in FIG. 2. Of course, it will be well understood by those with skill in the field that gravity flow is not the only means of flowing molten metal, as pumps for such are available in the market. Bevel 19 functions to both serve as a stationary seat abutment for ceramic body 11 and to permit ease of installation and removal thereof from the corresponding holding mechanism as will be easily understood by those with skill in the field. The ceramic body 11 may be used in conjunction with a gasket means (not shown) interposed between bevel 19 and the corresponding mating segment of the holding mechanism, as is known to those with skill in the field.

Bondable or sinterable ceramic powders, or mixtures of ceramic powders which are bondable or sinterable, are used as the starting raw material. The specification of the powder depends on the application in which the porous ceramic body is to be used. For filtration of molten aluminum, for example, alumina ($Al_2O_3$) may be used with appropriate sintering aids, or binders, such as, for example, calcium-alumino-borate glass or a phosphate-alumino-borate glass. Also particularly useful as sintering aids for alumina are magnesium oxide and/or calcium oxide. A typical composition of a liquid phase sinterable ceramic powder is 97.0 wt. percent $Al_2O_3$ with the addition of 3.0 wt. percent of glass powder formed from a combination of CaO, $Al_2O_3$ and $B_2O_3$ (molar ratio=1:0.79:1.31). A typical composition of a solid state phase sinterable ceramic powder is 99.8 wt. percent $Al_2O_3$ with 0.2 wt. percent MgO added. An example of an alumina ($Al_2O_3$) which can be used is A16SG which is commercially available from the Aluminum Company of America (Alcoa). Other equivalent sources are also available commercially.

For higher temperature applications, such as the filtering of molten copper, molten ductile or grey iron, or molten steel, it is preferred that a sinterable starting powder which is predominantly high purity, submicron partially stabilized zirconia (PSZ), or a mixture of PSZ and spinel powders which are sinterable, be used. Other materials may also be used in such high temperature applications or for other applications of the porous body. Such materials, for example, are SiC, $TiB_2$, $B_4C$, $Si_3N_4$ and SiAlON, all of which can be rendered sinterable and/or bondable as is well known by those with skill in the field. Materials which are usable as ceramic powders within the present invention may be either liquid phase or solid phase sinterable.

The polymer binder that is used may be either a thermosetting or a thermoplastic organic binder which can be pyrolyzed at temperatures below the sintering or bonding temperature, as the case may be, of the ceramic material. A preferred characteristic of the polymer binder is that it can be thoroughly and easily mixed with both the ceramic powder and the pore former. Preferably, the polymer binder, which constitutes about 30 to 80 volume percent of the mixture which contains only that polymer binder and the sinterable ceramic powder, will have a viscosity of less than about one million centipoise. This relatively low viscosity especially facilitates the blending of the polymer binder into the ceramic powder and pore former materials with the use of conventional mixers such as, for example, double arm mixers or conical mixers. Low viscosity is especially important where the consolidation process includes the injection molding of a paste of the polymer binder and the ceramic powder into a bed of pore former material. In such an application, the low viscosity decreases the injection pressure required and also the degree of elevated temperature as is normally associated with the injection molding process. Especially low viscosity is preferred for use of the consolidated material in the pour molding or slip casting methods of forming ceramic bodies. Also, it is possible to extrude the consolidated material into various forms.

Appropriate plasticizers can be used with the various types of usable polymer binders. For example, mineral oil can be blended with either high or low density polyethylene resins to lower the viscosity, and dibutyl phthalate can be blended with polyester resins with a similar effect. Such plasticizers, when integrated into the resin, may also act as a lubricant and/or may cause or enhance the beading of the resin in contact with the pore former surface.

A variety of different polymer binder materials can be used in the present invention. As suggested above, thermoplastic resins such as low or high density polyethylene are suitable, especially where injection molding techniques are used to form the consolidated body. Thermosetting resins such as epoxy or polyester are suitable where die pressing techniques are used to form the consolidated body. Polyester, in particular, is suitable, in relatively low viscosity form, for use where slip casting or pour molding techniques are used to form the consolidated body. Other types of resins are considered useful, such as, for example, polypropylene, phenolic and polyvinylchloride, provided they meet the above stated functional criteria. One key criterion in respect to the resin used is that it must either be liquid state, to begin with, or it must liquefy during the consolidation process, at least on its surface. Following this the resin must solidify. This phenomenon is referred to herein, variously, as "curing", "cure" and "cured".

One of the primary requirements for the resin, used as the polymer binder, is that it provide sufficient strength, after curing, to enable handling of the formed green body and, preferably, machining thereof. Another primary requirement is that the polymer binder maintain the structural integrity of the green body during the removal of the pore former materials and to a sufficiently high temperature to ensure that the green body does not disintegrate before it is calcined, as will be explained hereinafter. As used herein, the term "integrity" or "structural integrity" refers to capability of the structure to maintain and sustain itself in the shape and form in which it is produced, without external support, during succeeding manufacturing steps and thereafter in normal handling.

The pore former can be any suitable material that can be readily removed by liquification or other means from the consolidated body. For example, another means of removal of the pore former may be pyrolization or direct sublimation. One approach to removing the pore former material by liquification is by leaching with a solvent. An example of this is the use of calcium chloride, $CaCl_2$, as a pore former, with the leaching done, simply, with water. Another method of removing the pore former by liquification is by heating the green body to melt out the pore former material. An example of a pore former that can be used in this method is wax.

A critical element in the present invention is that there be a predominant relative difference in the surface tension of the pore former in respect to the surface tension of the resin. That is to say that the wetability of the resin in respect to the pore former should be such that a "beading" effect occurs. Thus, in this respect, the resin, before curing, will tend to bead on those surfaces of the pore former where there is no physical restraint to such; i.e., where there is some discrete open volume in which the beading can occur. As will be described hereinafter this occurs, within the present invention, in two (2) significant areas: the surfaces of the cells and the surfaces and edges of the interconnecting pores. As used herein, the term "edges" in respect to "interconnecting pores" or "pores" refers to the point or discrete area of transition between the cell walls and the walls of the interconnecting pores. The beading effect may be micro, for example, where the cell walls are smoothed by this beading, or it may be relatively macro, for example, where the pore edges are rounded off thereby. The wetability differential may be effected naturally as, for example, where the pore former material naturally produces a beading of the resin. Or it may be affected by modifying the composition of, and/or the surface of, either the pore former or resin, or both, such as for example, by adding a lubricant to the pore former, or adding plasticizers to the resin, or both. As used herein, the terms "lubricating properties", "lubricant", and "lubricity" are related to the foregoing beading phenomena as well as to the normal properties associated with those terms in respect to friction reduction. As used herein, the term "predominantly" means more so, than not, that which is specified, and the term "substantially" means being largely, but not wholly, that which is specified.

In the preferred embodiment of the present invention, the pore former is either combined with a lubricant, or acts, itself, as a lubricant. The lubricant can be soaked into the pore former, coated onto the pore former or mixed with the pore former material when the pore formers are, themselves, formed. For example, calcium chloride granules being porous, may be soaked in a lubricant such as, for example, No. 2 diesel fuel oil. As another example, urea spheres have been made by mixing the urea in No. 2 diesel fuel oil, followed by the formation of small sized spherical particles by conventional methods. Wax, on the other hand, does not normally need the addition of a lubricant as it tends to act naturally as a lubricant by itself. These phenomena may also be found where other materials, for example, low melting point metals such as zinc or lead, are used as pore formers. It has been found that by using either the lubricating properties of the pore former material, or by the combination of a lubricant with the pore formers or the pore former materials, the wall surfaces of the cells formed are noticeably smoother than those formed without a lubricating means. In addition, the ease of formation of the green body in pressing and injection molding techniques, is greatly enhanced. That is to say that the pressure requirements of consolidation, where pressure is used, are significantly reduced.

In addition, or alternatively, the lubricant, upon heating, may generate enough vapor pressure to puncture a thin film of ceramic and polymer which is interposed between adjacent particles of pore former. This will aid in generation of connected porosity. The properties of the lubricant should preferably be such that they allow lubricated pore former particles to contact each other, without any substantial intervening mixture of ceramic and polymer binder at those points where adjacent particles of pore former are in close proximity to each other. This displacement of the ceramic and resin binder is preferred to enhance connected porosity.

Typically, pore formers in the range of +3.5–4, +4–6, 6–8 and +8–20, as related to Tyler mesh screen sizing, are suitable for forming pores in the size range of about 500 to about 1300 microns. These pore former size ranges are specifically useful in a substantially alumina sintered ceramic body for filtering molten aluminum. A preferred pore former material for forming the foregoing sized pores in a sintered alumina body, where leaching is appropriate to remove the pore former, is calcium chloride. Preferably, the calcium chloride is sieved through a series of Tyler mesh screens, as is well known to those with skill in the field, and used, either monosized or multisized, as desired. A readily available and acceptable form of calcium chloride which may be used as a pore former is calcium chloride ice melting material available at most hardware stores for home use, etc. In all pore formers, a generally spherical shape is more preferred, although other shapes which will permit the formation of smooth walled, interconnected cells, are equally acceptable. The surface of the pore formers as used should exhibit a smoothness of about 125 micro inches or smoother, preferably 32 micro inches or smoother for best results. This can be achieved either by employing pore formers with these surface characteristics or by the surface of the pore formers being smoothed by the adherence of liquid during the consolidation process.

Figure 4:
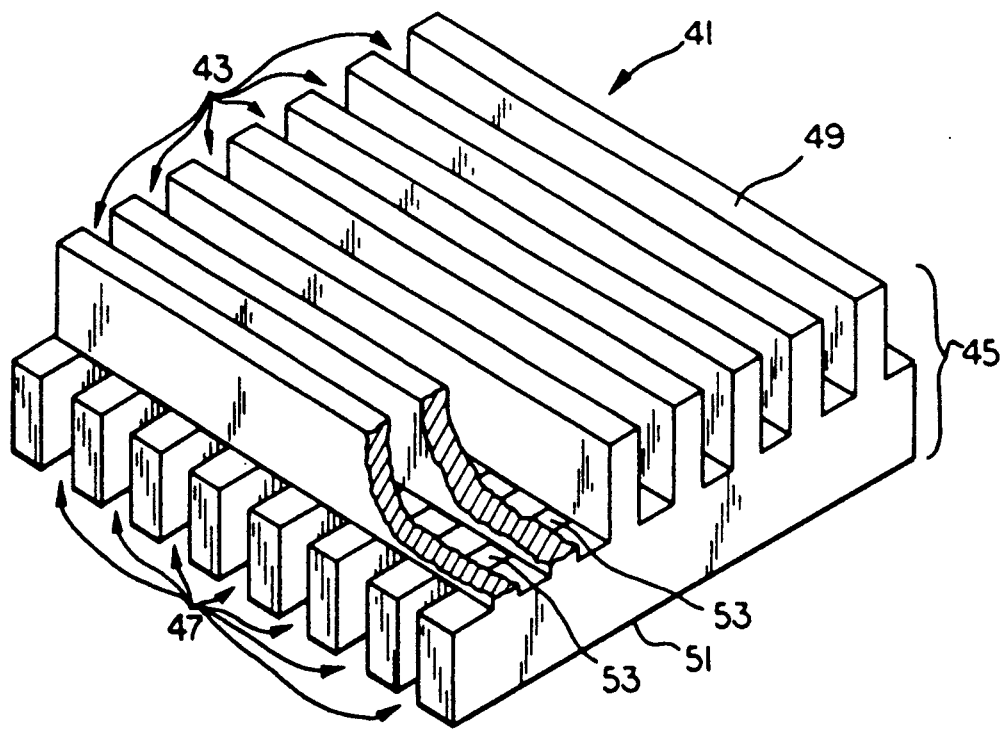
FIG. 4 is a projection view, partially cut-away, of an alternate pore former within the present invention.

An alternate shape of a pore former is shown in FIG. 4. The pore former of FIG. 4 has been formed from a solid, rectangular shaped block of wax 41. The forming has been done by any appropriate means or method as will be well understood by those well skilled in the field. The forming is in the nature of grooves 43 extending half way through the depth 45 of the block 41 from face 49. Alternate grooves 47, set at a 90° angles (perpendicular) to grooves 43, extend half way through the depth 45 of the block 41 from face 51 which is that face which is opposite to, but on a parallel plane with, face 49. At the point where the depth extension of grooves 43 and alternate grooves 47 meet, windows 53 are formed. As will be well understood by those with skill in the art, the pore formers of FIG. 4 may be stacked upon each other with alternate grooves 47 being positioned perpendicular to or otherwise at angle to grooves 43 of the block 41 beneath. Also windows 53 of each block 41 may be aligned or non-aligned with the windows 53 of the block 41 beneath. The pore former shown in FIG. 4 is particularly advantageous where a filter medium of zirconia is to be formed for the filtration of molten ferrous metals such as, for example, steel.

As mentioned above, the mixing of the ceramic powders and resin components of the system can be done in any conventional manner. It is, however, important that those components be uniformly mixed and equally and evenly dispersed among each other to ensure that the sinterable ceramic powder is evenly dispersed in the polymer binders. When the mixture of these components is subsequently blended and mixed with the pore formers, it is important to ensure that there are no voids therein and that all interstitial space between the pore formers is substantially filled to ensure structural strength and integrity.

In a situation where localization, gradation or disruption in the uniform dispersion of the cells (as previously filled by the pore formers) is desired in the sintered porous body, the pore formers are added selectively to the mixture. For example, a uniform mixture of sinterable ceramic powder and polymer binder are formed and divided into two (2) portions. Into the first portion, a given size of pore formers are uniformly mixed and the mixture is placed into the die of a press, partially filling the die cavity, and leveled. The second portion of the sinterable ceramic powder/polymer binder mixture is mixed with a different sized pore former and is placed into the same die cavity, on top of the first mixture, thus filling the die cavity to the appropriate level for pressing. The sintered porous ceramic body resulting from this method will have localized cell sizing, with two distinctly different cell sizes in two different sections of that body, respectively. This method can be varied to add additional cell sizes to localized sections of a given body, or to decrease or increase the number of cells for a given volume at localized sections of that body. Also, it is possible to eliminate the cells in discrete portions or sections of that body, as will be well understood by those with skill in the field.

A mixture of Alcoa A16SG alumina was blended with Silmar S-585 polyester resin, as manufactured and marketed by The Standard Oil Company and 0.5 wt. percent of methyl ethyl ketone (MEK) peroxide, manufactured by Pennwalt/Ludicol, as a curing catalyst for the polyester resin. The alumina constituted about 40 vol. percent of the mixture of alumina and polyester resin. Added to the mixture of these first two components was calcium chloride of a +4-6 Tyler mesh sizing. The calcium chloride comprised about 70 vol. percent of the final mixture of the three components. The mixture was thoroughly blended in a standard double arm mixer and several portions were subsequently loaded into an $2\frac{1}{4}$" (5.7 cm) round die, with a 1" (2.5 cm) working depth, and pressed. It was found that consolidation die pressures in a range of 2400 to 2500 psi were adequate to ensure that the calcium chloride granules were sufficiently in contact with each other to produce the formation of substantially interconnected pores in the sintered porous ceramic body produced. As used herein, the term "cells" refers to the discrete open volumes, or voids, within the porous ceramic body formerly occupied by the pore formers and the term "pores" refers to the interconnecting passageways between the cells. This polyester resin was selected for use with calcium chloride because it was noted that it appeared to have a relatively low amount of wetability in respect to calcium chloride. That is to say that it appeared to bead up more when in contact with the surface of a calcium chloride pore former in comparison to other polyester resins which were considered.

It has been found that the pressure required to consolidate the green bodies being formed can be significantly reduced if a lubricant is added to the pore former or if the pore former is self-lubricating, as is the situation where wax pore formers are used. This reduction in pressure is significant, being about $\frac{1}{3}$ or less of that otherwise required. In the press and die compaction forming technique, the typical 2400 psi to 2500 psi pressure, normally required to compact the mixtures to the point where the sintered porous body contained cells that were substantially interconnecting, was capable of being reduced to a typical range of about 700 psi to 800 psi. This was done by impregnating the porous calcium chloride with No. 2 diesel fuel oil. Another benefit accrued, by using the lubricant, is that the walls of the cells of the sintered porous body were visibly and notably smoothened. Further, it was found that the edges of the pores were rounded off and smoothened. And further, it was found that the walls of the pores were notably smoothened. The significance of this is that there is less resistance to the flow of the molten metal through the porous body. The term "consolidation" as used above in this paragraph refers to the application of mechanical pressure to the blended mixture of ceramic powders, resins and pore formers, causing substantially all of the pore formers to be in sufficiently close spatial relationship to each other such that pores develop between each cell and at least two (2) adjacent cells, following liquification of the pore formers and sintering. Otherwise, "consolidation" refers to any method by which the mixture of ceramic powder and resin is interposed between and among the pore formers such that pores develop between each cell and at least two (2) adjacent cells. For example, in using pore formers as shown in FIG. 4, the viscosity of the resin/ceramic mixture is reduced to the point where it can be pour molded by selection of low viscosity resins and/or by the addition of appropriate plasticizers as will be understood by those with skill in the field.

Once the green body has been formed by way of consolidation, as described above, and the resin has cured, the pore former must be removed. When a leachable pore former is used, after the resin in the green body has cured, the green body is immersed into a solvent to dissolve the pore former. For example, when calcium chloride is used as the pore former, the resin cured green body is immersed in water for a sufficient time to dissolve the calcium chloride and leave a porous green body. The porous green body is then preferably thoroughly rinsed with water, to remove traces of calcium chloride, and dried. Of course, for the pore formers to dissolve and leave, the pores must have been formed.

When wax or another meltable pore former is used, that pore former must be melted out by subjecting the green body to a temperature above the melting point of the pore former material. This can be done as a separate step or the pore former can be melted out as the green body is gradually raised to calcining and then sintering temperature as will be explained hereinafter. When using wax as the pore former, some of the pores are formed by direct contact of the pore formers with each other after consolidation, while other pores may be formed by the gas pressure created by the volatilization of the hot wax as the temperature of the green body is increased toward full sintering temperature.

The shaped, resin-cured green bodies, consisting of the polymer binder and the sinterable ceramic powder, are then fired in a furnace to both burn off the polymer binder and to sinter or bond the ceramic powder into a porous ceramic body. As the polymer binder burns off, the ceramic powder particles move towards each other, densifying as the particles sinter to each other. The overall dimensions of the ceramic body decrease as this occurs, producing a dimensional "shrink" and the sintering produces high structural strength and integrity.

Typically, the green body is placed in a furnace which can be controlled to vary the rate of increase in temperature per unit of time. When the sinterable ceramic powder is substantially alumina, the temperature of the furnace, for example, beginning at about 150° C., is raised to about 600° C. at a rate of about 10° C./hour to 30° C./hour. This step effectively calcines the green body. No special atmosphere is needed as sintering of alumina will occur in air. At the point where the green body has reached 600° C., any meltable pore former should have either melted out or vaporized. And most, if not all, of the polymer binder has burned off at 600° C., and the densification and shrinkage commences thereafter as the temperature is increased to full sintering temperature.

At the point where the substantially alumina green body, substantially minus the pore former, has reached, for example, about 600° C., the rate of temperature elevation may be, for example, increased to a range of about 200° C./hour to 400° C./hour, and the green body is brought up to full sintering temperature and held there for a sufficient time for complete sintering to occur. For solid state phase sintering of Alcoa A16SG alumina, with a 0.2 wt. percent MgO added, a sintering temperature of 1550° C. for two hours is generally considered sufficient for substantially complete sintering. The sintering produces a mechanically strong, self-sustaining body with cells substantially interconnected by pores, with relatively high impact resistance and relatively substantially reduced friability in comparison to known ceramic filters.

After a substantially alumina ceramic body has been held at the sintering temperature for a sufficient time to substantially sinter the ceramic material, the body must be cooled. It is, of course, economically expedient to cool the body as quickly as possible. On the other hand, care must be taken to cool it slowly enough so that thermal shock and cracking are avoided. Once cooled, the porous ceramic body is ready for use.

In mixing the components together for use in injection molding techniques, it is preferable to leave out the pore formers from the initial component mix, thus only mixing together the sinterable ceramic powder and the polymer binder. The pore formers, however, are loaded into the cavity of the injection molding apparatus and the sinterable ceramic powder/polymer binder mixture is then injected into that cavity to fill the interstitial space between the pore former particles, thus simultaneously admixing the resin/ceramic powder mixture with the pore formers and consolidating those components.

Alternatively, in respect to injection molding, the sinterable ceramic powders and the polymer binders can be mixed together in such volumes that the sinterable ceramic powders constitute between 20 and 70 vol. percent of that mixture, and, preferably, between 40 and 70 vol. percent thereof. Using thermoplastic resins as polymer binders, these mixtures can be granulated using standard procedures for compounding polymers with inert fillers. The granules are then injected into the die of an injection molding apparatus, provided, that the die has first been loaded with pore formers and the pore formers pressed into a compact bed just before the injection of the granules. It has been found that this method ensures that the pore formers are all in contact with each other and that all of the interstitial space between the pore formers are filled with the sinterable/ceramic powder/polymer binder mixture. The pieces are otherwise molded according to standard injection molding practice. The sintered porous ceramic bodies thus produced have been found to include substantially interconnected cells.

It has also been found that granulated mixtures of sinterable ceramic powder and thermoplastic resin can be blended with pore formers and pressed together in a standard compression molding apparatus wherein the die is heated to a temperature selected according to the viscosity/temperature relationship of the particular resin being used.

When thermosetting resins are used, the pieces can be cured in the die by heating the die following compaction, or the pressed pieces can be removed directly from the die following pressing and cured in a separate step. In the case of the use of thermoplastic resins, the pieces are allowed to cool and cure in the die, so as to facilitate their removal from that die.

EXAMPLES

Example 1

A set of four (4) porous sintered ceramic bodies were fabricated, two of which contained 97 wt. percent Alcoa A16SG alumina and 3 wt. percent calcium-alumino-borate glass powder and two of which contained 99.8 wt. percent Alcoa A16SG alumina and 0.2 wt. percent magnesium oxide (MgO). The details of fabrication are as follows:

| Sample Code: | Ceramic: Vol. percent of Ceramic plus resin mixture | CaCl₂: pore former Vol. Ceramic, resin and pore former | Density: g/cc after leaching | Density: g/cc after sintering |
| --- | --- | --- | --- | --- |
| A6040 | 40.5 | 66 | 0.67 | 0.90 |
| A7040 | 40.5 | 75 | 0.50 | 0.66 |
| B6040 | 39.7 | 66 | 0.70 | 0.91 |
| B7040 | 39.7 | 75 | 0.48 | 0.62 |

| | |
| --- | --- |
| A6040 and A7040: | 99.8 wt. percent $Al_2O_3$, 0.2 wt. percent MgO |
| B6040 and B7040: | 97.0 wt. percent $Al_2O_3$, 3.0 wt. percent glass ($CaO/Al_2O_3/B_2O_3$ = 1/0.79/1.31 Molar Ratio) manufactured by Ferro Corporation and designated as XF 41 |
| Pore Former: | Average diameter, 3.2 mm., $CaCl_2$, J. T. Baker Desiccant grade |
| Resin: | Epoxy (Epokwick) + Hardener (EpoKwick) both marketed by Beuhler |
| Compaction Pressure: | ~2500 psi @ room temperature |
| Sample Diameter: | 2.25" |
| Cure: | Room Temperature - 2 hours |
| Leaching: | Water @ 90° C. ± 10° C. for - one hour |
| Drying: | Optional |
| Firing: | 150° C.-800° C. @ ~20° C./hour 800° C.-1550° C. @ ~125° C./hour 1550° C. hold for 2 hours 1550° C.-20° C. furnace cool, ~6 hours |

Drying was done between leaching and forming only to enable green body density measurements; drying is not required to make the sintered body. The particular epoxy resin/hardener system was selected as it appeared to bead to a relative greater degree, in contact with $CaCl_2$ pore formers, than some other epoxy/hardener systems that were considered.

After sintering, the sample pieces were measured to determine the effects of sintering on the density and sizing of the green bodies as measured before firing. The results are as follows:

| Sample Code: | Density: g/cc after sintering | Percent change in density from green body to sintered body | Diameter Change: percent | Thickness Change: percent |
| --- | --- | --- | --- | --- |
| A6040 | 0.896 | +35.3 | −19.9 | −17.7 |
| A7040 | 0.662 | +32.9 | −19.7 | −18.1 |
| B6040 | 0.910 | +30.2 | −18.7 | −19.1 |
| B7040 | 0.622 | +28.6 | −18.9 | −19.4 |

The sintered porous ceramic sample pieces were then examined to determine the average pore sizes. Those same sample pieces were then tested to determine, firstly, the starting head of molten aluminum that was maintained thereby. That is to say, the depth of molten aluminum above each filter body sample piece was measured. Secondly, the percentage volume of the filter body, which was filled by molten aluminum, was determined. The third item which was determined, but prior in time to the molten aluminum tests, was the volume of air per unit of time that would flow through the filter body at a standard air pressure of 2000 dynes/cm², Re>20, against the entry face of the filter body sample piece. The results of these tests are as follows:

| Sample Code: | Average Sintered Pore Diameter | Initial Metal Head Depth | Vol. % Filled by Al | Air Flow Rate cm3/sec at 2000 dynes/cm2 |
| --- | --- | --- | --- | --- |
| A6040 | 1.140 mm | 11.8 cm | 45.6 | 99 |
| A7040 | 1.245 mm | 11.0 cm | 40.9 | 123 |
| B6040 | 0.840 mm | 15.6 cm | 48.6 | 74 |
| B7040 | 0.560 mm | 24.3 cm | 39.3 | 66 |

Example 2

A paste was prepared by mixing epoxy resin, a hardener and $Al_2O_3 + 0.2\%$ MgO in a ratio such that the ceramic was 40 volume percent of the paste. The epoxy resin and hardener were those that were stated, above, for Example 1, and the alumina ($Al_2O_3$) was the Alcoa A16SG material, also as stated above for Example 1. This paste was injected into the cavity of an injection molding apparatus after first having packed the 3" diameter die of that injection molding apparatus with +4−6 $CaCl_2$ granules. The injection pressure used was 1600 psi. After substantial infiltration of the paste into the intersticial space between the packed $CaCl_2$ granules, the consolidated piece was removed from the die and the resin cured at room temperature. The piece was then leached in water and dried. The piece was then fired according to the firing schedule defined, above, for Example 1, and cooled. The shrinkage, comparing the green body with the sintered body, was 21% for the diameter and 27% for the thickness. The final density of the sintered body was 1.15 g/cc.

Example 3

A set of two (2) porous sintered ceramic bodies were fabricated which contained 99.8 wt. percent Alcoa A16SG alumina and 0.2 wt. percent MgO. The details of the fabrications are as follows:

| Sample Code: | Ceramic: Vol. percent of Ceramic plus resin mixture | $CaCl_2$: pore former Vol. %, Ceramic, resin and pore former mixture | Density: g/cc after leaching | Density: g/cc after firing |
|---|---|---|---|---|
| A7060-46-05 | 40 | 70 | 0.51 | 0.73 |
| A7060-46-06 | 40 | 70 | 0.55 | 0.80 |

| | |
|---|---|
| A7060-46-05 A7060-46-06: | 99.8 wt. percent $Al_2O_3$, 0.2 wt. percent MgO |
| Pore Former: | −4 + 6 mesh (Tyler) size, $CaCl_2$ |
| Resin: | Standard Oil Co. Silmar S-585 polyester resin with 0.5 wt. % of Pennwalt Ludicol DDM-9 MEK peroxide added as a curing catalyst |
| Compaction Pressure: | A7060-46-05 = 750. psi @ room temperature A7060-46-06 = 1250 psi @ room temperature |
| Sample Diameter: | A7060-46-05 = 2.25" dia × 0.98" thick A7060-46-06 = 2.25" dia × 0.90" thick |
| Cure: | ~55° C. for ½ hour, die cured |
| Leaching: | Flowing water in a tank @ 70-75° for ~1 hour until weight loss had reached a constant value |
| Drying: | Optional |
| Firing: | 20° C.-600° C., 29 hrs. @ ~20° C./hour increase 600° C.-1550° C., 4.75 hrs. @ ~200° C./hour increase 1550° C. hold for ~2 hrs. 1550° C.-20° C., ~4 hrs., furnace cool |

The resin (plus catalyst) was first mixed to uniformity. To this were added the $Al_2O_3$ and MgO powders. This combination was then mixed sufficiently to ensure homogeneity and complete wetting of the powders. Then the pore former $CaCl_2$ was added and a third mixing step was employed, again to ensure homogeneity and complete admixing of the $CaCl_2$ with the resin/ceramic powder mixture. The mixing times for each of the three mixing steps was in the range of 1–3 minutes.

The mixture was then removed from the mixer and was loaded into a standard steel die, using a combination of vegetable oil and wax paper as a mold release. The steel dies were then mounted in a Carver hydraulic press and compacted with a dwell time of 10–15 seconds. Then the samples were cured in the die at ~55° C. for one-half hour then removed. Following the curing, the samples were placed in a water tank, through which water was flowing, and leached until the weight loss had reached a constant value, to remove the pore former. Then the samples were dried for a sufficient time to evaporate substantially all of the water from the pores created by leaching. Finally, the dried body was fired using the Schedule A cycle, described above in this Example.

After sintering, the sample pieces were measured to determine the affects of sintering on the density and sizing of the green bodies as measured before firing. The results are as follows:

| Sample Code: | Density: g/cc after sintering | Percent change in density from green body to sintered body | Diameter Change: Percent | Thickness Change: Percent |
|---|---|---|---|---|
| A7060-46-05 | 0.73 | +45.0 | −22.0 | −21.9 |
| A7060-46-06 | 0.80 | +45.5 | −20.5 | −22.8 |

The sintered porous sample pieces were then examined to determine the average pore sizes. Those same sample pieces were then tested to determine, firstly, the starting head of molten aluminum that was maintained thereby. Secondly, the percentage volume of the filter body, which was filled by molten aluminum as it flowed through that filter body, was determined. Finally, the aluminum permeability, in lbs/sq. ft./min. was determined by general application of the following formula:

$$\frac{\text{lbs. of Al}}{\text{Sq. ft/min}} \times \frac{\text{in (thickness)}}{\text{pressure head (in Al)}}$$

The results are as follows:

| Sample Code: | Average Sintered Pore Diameter | Initial Metal Head Depth | Vol. % Filled by Al (Porosity) | Aluminum Permeability lb/sq. ft. min. |
|---|---|---|---|---|
| A7060-46-05 | 0.031" | 6.9" | 69 | 60 |
| A7060-46-06 | 0.048" | 4.4" | 51 | 190 |

It will be noted that the compaction pressures used in Example 3 were significantly reduced from those used in Example 1, this being attributed to the relatively greater lubricating properties exhibited by the resin used in Example 3 in comparison to that used in Example 1.

Example 4

A set of two (2) porous sintered ceramic bodies were fabricated using a fabrication technique similar to those of Example 3, the only significant difference being that the CaCl₂ pore former was soaked in #2 diesel fuel oil prior to incorporation into the resin/ceramic powder/pore former mixture. The details of the fabrication of these two (2) sample batches are as follows:

| Sample Code: | Ceramic: Vol. percent of Ceramic plus resin mixture | CaCl₂: pore former Vol. Ceramic, resin and pore former mixture | Density: g/cc after leaching | Density: g/cc after firing |
| --- | --- | --- | --- | --- |
| OA7060-46-01 | 40 | 70 | 0.54 | 0.69 |
| OA7060-46-08 | 40 | 70 | 0.63 | 0.75 |

The compaction pressure used to form green body OA7060-46-01 was 750 psi and to form green body OA7060-46-08 was 1250 psi. The sample size of OA7060-46-01 was 2.25" diameter×0.90" thick and the sample size of OA7060-46-08 was 2.25" diameter×0.86" thick. The firing schedule used for the samples of both Example 4 and Example 5, following, is as follows:

60° C.-600° C., 36 hours, ~15° C. per hour
600° C.-1550° C., 4.75 hours, ~200° C. per hour
1550° C. hold for 2 hours
1550° C.-20° C., ~4 hours After sintering, the sample pieces were measured to determine the affects of sintering on the density and sizing of the green bodies as measured before firing. The results are as follows:

| Sample Code: | Density: g/cc after firing | Percent change in density from green body to sintered body | Diameter Change: Percent | Thickness Change: Percent |
| --- | --- | --- | --- | --- |
| OA7060-46-01 | 0.69 | +26.8 | −20.7 | −21.3 |
| OA7060-46-08 | 0.75 | +19.7 | −20.9 | −20.5 |

The sintered porous sample pieces were then examined to determine the average pore sizes. Those same sample pieces were then tested to determine, firstly, the starting head of molten aluminum that was maintained thereby. Secondly, the percentage volume of the filter body, which was filled by molten aluminum as it flowed through that filter body, was determined. Finally, the aluminum permeability, in lbs/sq. ft./min. was determined. The results are as follows:

| Sample Code: | Average Sintered Pore Diameter | Initial Metal Head Depth | Vol. % Filled by Al (Porosity) | Aluminum Permeability lb/sq. ft. min. |
| --- | --- | --- | --- | --- |
| OA7060-46-01 | 0.053" | 4.0" | 63 | 483 |
| OA7060-46-08 | 0.064" | 3.3" | 61 | 542 |

It should be restated and emphasized that the compaction pressure necessary in Example 4 was significantly lower than that which was necessary in Examples 1 and 3, the significant change being that a lubricant was used with the pore formers in Example 4 while none was used in Examples 1 and 3. In Example 3 where the compaction pressures were parallel, sample-for-sample, with those of Example 4, the aluminum permeability was greatly increased. The only significant change between Example 3 and Example 4 was the addition of a lubricant to the pore former of Example 4 despite the fact that an epoxy resin, with relatively lower lubricating characteristics, was used in Example 4. Also, a comparison of the cells and the pores of the samples of Examples 1 through 3 with the samples of Example 4 showed a significant increase in the smoothness of the cell walls and the pore walls, and a much greater smoothing or rounding of the edges where the cell walls met the pores for the samples of Example 4.

Example 5

A set of two (2) porous sintered ceramic were fabricated which were identical in fabrication technique to those of Example 3 except that CaCl₂ was not used as a pore former material. Rather, wax pore formers were prepared from Kindt-Collins #KC210 wax, having a melting point of about 90° C., sufficiently above the 70° C.-75° C. curing temperature of the resin so as to remain solid during the curing step of the process. As with the CaCl₂ pore formers used in previous examples, the wax pore formers were sized at −4+6 mesh (Tyler) size, by standard sieving techniques employing Tyler mesh screening. And, as a consequence of using wax, instead of CaCl₂, as a pore former, the leaching step was replaced with a melting step, following the resin curing step. The resin-cured green body was heated to about 110° C., somewhat above the melting point of the wax, to liquefy the wax, thus causing it to flow out of the green body, creating the pores. The resin cured green body was maintained at this temperature for a time sufficient to permit the weight loss to reach a constant value. In all other respects, the fabrication techniques applied were equivalent to those of Example 1. The details of the fabrication of these two (2) samples are as follows:

| Sample Code: | Ceramic: Vol. percent of Ceramic plus resin mixture | Wax: Vol. Percent Ceramic, resin, and pore former mixture | Density: g/cc after wax melt-out | Density: g/cc after firing |
|---|---|---|---|---|
| WA7060-46-05 | 40 | 70 | 0.60 | 0.75 |
| WA7060-46-06 | 40 | 70 | 0.61 | 0.75 |

The compaction pressure to form green body WA7060-46-05 was 750 psi and to form green body WA7060-46-06 was 1250 psi. The sample size of WA7060-46-05 was 2.25" diameter×0.92" thick, and the sample size of WA7060-46-06 was 2.25" diameter×0.91" thick.

After sintering, the sample pieces were measured to determine the affects of sintering on the density and sizing of the green bodies in comparison with those measurements before firing. The results are as follows:

| Sample Code: | Density: g/cc after firing | Percent change in density from green body to sintered body | Diameter Change: percent | Thickness Change: percent |
|---|---|---|---|---|
| WA7060-46-05 | 0.75 | +23.9 | −20.9 | −21.8 |
| WA7060-46-06 | 0.75 | +22.5 | −21.2 | −21.8 |

The sintered porous sample pieces were then examined to determine the average pore sizes. Those same sample pieces were then tested to determine, firstly, the starting head of molten aluminum that was maintained thereby. Secondly, the percentage volume of the filter body, which was filled by molten aluminum as it flowed through that filter body, was determined. Finally, the aluminum permeability, in lbs/sq. ft. min. was determined. The results are as follows:

| Sample Code: | Average Sintered Pore Diameter | Initial Metal Head Depth | Vol. % Filled by Al (Porosity) | Aluminum Permeability lb/sq. ft. min. |
|---|---|---|---|---|
| WA7060-46-05 | 0.056" | 3.75" | 71 | 560 |
| WA7060- | 0.062" | 3.40" | 70 | 625 |

A significant portion of the cells in this Example were deformed, more or less in the form of squashed spheres, whereas in previous Examples, the cells were found to be substantially spherical. It is believed that the deformed cells were caused by the relative softness of the wax pore formers and the high malleability of wax under pressure.

As will be noted from comparing Examples 3–5, there is a significant increase in aluminum permeability between Example 3, where a CaCl₂ pore former was used without a lubricant, and Example 4, where CaCl₂, soaked in #2 diesel fuel oil as a lubricant, was used as a pore former. Also there is a significant increase in aluminum permeability between Example 4, where lubricated CaCl₂ was used as a pore former and Example 5 where self-lubricating wax was used. Visual inspection of the cell walls, the pore walls and the pore edges of Examples 3–5 revealed that those of Examples 4 and 5 appeared much smoother than those of Example 3, with the pore edges of the samples of Examples 4 and 5 being much more rounded and smoothened than those of Example 3. A comparison of the samples of Example 4 with Example 5 showed that the samples of Example 5 had smoother cell and pore walls and the pore edges of the samples of Example 5 appeared more rounded and smooth. The pore diameters of the samples of Example 3 were significantly smaller than those of Examples 4 and 5 although the same size of pore formers were used in the samples of all three of Examples 3–5. Also there is a significant drop in the initial aluminum metal head depth in comparing the samples of Example 3 with those of Examples 4 and 5. In comparing the volume percentage of the body filled by molten aluminum; i.e., the effective porosity, of the bodies of Examples 3–5, it is noted that sample A7060-46-05 of Example 3 had a greater percentage (69%) of porosity than sample OA7060-4605 of Example 4 (63%) while the pore diameter of sample A7060-4605 was less (0.031") than that of OA7060-46-05 (0.053"); yet the starting head of A7060-46-05 was significantly greater than OA7060-46-01 and the aluminum permeability of A7060-46-05 was less than OA7060-46-01. There was no significant difference in the fired or sintered density of the samples of Examples 3–5.

Example 6

(Sample Code U7060-46-1) A porous sintered ceramic body was made using urea as a pore former. For this sample, Standard Oil Silmar DL-459 polyester resin was used (mixed with Luperco AMS Hardener as a curing catalyst) along with a ceramic powder mixture. The ceramic powder mixture was 90 wt. percent Alcoa A16SG Al₂O₃ plus 10 wt. percent Ferro XF-41 CAB glass frit (CaO/Al₂O₃/B₂O₃ = 1/0.79/1.31 molar ratio). 60 vol. percent of resin was mixed with 40 vol. percent of ceramic powder. This mixture was then mixed with −4+6 mesh (Tyler) size urea pore former such that 69 vol. percent of the total mixture was pore former. The total mixture was pressed at 750 psi and cured. The urea pore former was melted out at 150° C. The resultant green body was fired according to the following schedule:

60° C.–600° C. @ ~15° C./hour, 36 hours
600° C.–1200° C. @ ~200° C./hour, 3 hours 1200° C. hold for 2 hours
1200° C.–700° C. @ ~1000° C./hour, 0.5 hours
700° C.–20° C. @ ~340° C./hour, 2 hours The fired body of Example 6 was not tested with molten metal (aluminum), however, it appeared visually to be quite similar to the samples of Example 3, above, which were successfully tested with molten aluminum.

Example 7

A set of five (5) porous ceramic bodies were fabricated using #2 diesel fuel oil as a pore former lubricant, and using a vacuum to evacuate the $CaCl_2$ pore former to enhance soaking by the lubricant. In forming these porous bodies, the compaction pressure was varied on some to determine if such would have an effect on green body density. The details of fabrication are as follows:

| Sample Code: | Die Pressure psi | Density After Pressing | Total g/cc after leaching | g/cc after firing | Porosity Vol. % |
| --- | --- | --- | --- | --- | --- |
| 8-7A | 750 | 1.74 g/cc | 0.71 | 0.58 | 85.0 |
| 8-7B | 750 | 1.63 g/cc | 0.59 | 0.55 | 86.0 |
| 8-7C | 750 | 1.75 g/cc | 0.66 | 0.61 | 84.5 |
| 8-7D | 1500 | 1.72 g/cc | 0.65 | 0.55 | 86.0 |
| 8-7E | 3000 | 1.81 g/cc | 0.69 | 0.63 | 84.0 |

These samples were formed with lubricated pore formers using the following mixture to make a single batch from which each sample was formed:
1300 g $CaCl_2$, −4+6 mesh
480.6 g Alcoa A16SG alumina ($Al_2O_3$)
24.62 Ferro XF-41 CAB (Calcium alumino borate) glass frit
($CaCO/Al_2O_3/B_2O_3$ = 1/0.79/1.31 Molar Ratio)
227.5 g Standard Oil S-585 Silmar Polyester resin
1.14 g. MEK peroxide, designated DDM-9, manufactured by Ludicol Division of Pennwalt A standard double arm mixer was used to thoroughly blend the mix. An 8" diameter die was used to form sample no. 8-7A while a 2.25" diameter die was used to form all of the other samples. All of the samples were leached in water for about 3 hours each. The firing schedule for these samples was as follows:
60° C.–600° C. @ ~15° C./hour
600° C.–1200° C. @ ~200° C./hour
1200° C.—hold for 2 hours
1200° C.–700° C. @ ~1000° C./hour
700° C.–20° C. @ ~340° C./hour Samples 8-7C, 8-7D and 8-7E, above, were formed to determine the effect on density by increasing the die pressure; these samples were not further tested. It is noted that there was no significant increase in density after pressing when the die pressure was increased, indicating that full pressed density was achieved at about 750 psi.

One of the lubricated pore former samples, sample number 8-7B, was then compared with sample numbers A7060-46-05 and A7060-46-06, from Example 3, which were made with unlubricated pore formers. The results of these comparisons are as follows:

| Sample Code: | Die Pressure psi | Initial Metal Head Depth | Pore Diameter (Range ± 5%) | Vol. % Filled by Al (Porosity) | Aluminum Permeability lb./sq. ft. min |
| --- | --- | --- | --- | --- | --- |
| 8-7B | 750 | 8.39 cm | 1.65 mm | 67 | 1000 |
| A7060-46-05 | 750 | 17.53 cm | 1.22 mm | 69 | 60 |
| A7060-46-06 | 1250 | 11.18 cm | 1.22 mm | 51 | 190 |

Note that the pore diameter is significantly increased by the use of lubricated pore formers, although the pore former size ranges and distribution of all three samples were equivalent. The resistance to the flow of molten metal, as measured by the depth of metal head initially maintained by the filter body, is significantly decreased for sample 8-7B. Even when the compaction pressure is doubled (compare A7060-46-05 and A7060-46-06), the initial metal head depth is still significantly greater when compared to the sample made at lower compaction pressure but with a lubricated pore former (compare A7060-46-06 and 8-7B).

Example 8

A set of four (4) porous ceramic bodies were fabricated using zirconium oxide (zirconia, $ZrO_2$) power as a base ceramic powder. Yttrium oxide ($Y_2O_3$) powder was added to the $ZrO_2$ powder to produce a ceramic powder mix and the end product ceramic bodies were characterized as partially stabilized zirconia (PSZ). The ceramic powder mix including 3 mole % of $Y_2O_3$ mixed with the balance of $ZrO_2$ was obtained commercially from Toyo Soda, designated TZ-3Y. The resin used was Standard Oil S-585 Silmar, polyester resin, using Ludicol MEK peroxide as a curing catalyst. The pore former was +4–6 mesh (Tyler) size $CaCl_2$ soaked in #2 diesel fuel oil. The details of fabrication are as follows:

| Sample Code: | Ceramic: Vol. percent of Ceramic plus resin mixture | $CaCl_2$: pore former Vol. %, Ceramic, resin and pore former mixture | Density: g/cc after leaching | Density: g/cc after firing |
| --- | --- | --- | --- | --- |
| Z-3A | 30.7 | 64.2 | 0.80 | 1.42 |
| Z-3B | 30.7 | 64.2 | 0.80 | 1.46 |
| Z-5A | 33.1 | 65.9 | 0.85 | 1.63 |
| Z-5B | 33.1 | 65.9 | 0.75 | 1.39 |

All of the foregoing $ZrO_2$ samples were compaction pressed at 1500 psi. All of the green bodies produced were fired according to the following schedule:
60° C.–600° C., 36 hrs. @ ~15° C./hour increase
600° C.–1550° C., 4.75 hrs. @ ~200° C./hour increase
1550° C. hold for 2 hrs.
1550° C.–20° C., ~4 hrs., furnace cool The firing was done in an air atmosphere. All of the mixing leaching and curing done for the samples of this Example were done according to the specifications set forth for Example 4, above. The size of the samples produced for this Example were all 2.25" diameter with thickness in the range of 0.47–0.71".

After sintering, the sample pieces were measured to determine the affects of sintering on the density and sizing of the green bodies as measured before firing. The results are as follows:

| Sample Code: | Density: g/cc after sintering | Percent change in density from green body to sintered body | Diameter Change: percent | Thickness Change: percent |
|---|---|---|---|---|
| Z-3A | 1.42 | +77.9 | −27.1 | −24.2 |
| Z-3B | 1.46 | +82.3 | −27.4 | −27.0 |
| Z-5A | 1.63 | +92.9 | −27.2 | −27.3 |
| Z-5B | 1.39 | +86.6 | −26.5 | −26.4 |

The fired bodies of Example 8 were not tested with molten metal (aluminum), however, they appeared visually to be quite similar to the samples of Example 4, above, which were successfully tested with molten aluminum. In addition, it is believed that because of the ability of PSZ to withstand significantly higher temperatures of molten metals beyond that of molten aluminum, the PSZ samples of Example 8 may be used to filter molten copper, brass, bronze, and steels (both mild steels and stainless steels).

One factor that appears to remain consistent in regard to all of the samples tested and analyzed in the foregoing examples is that the volume of the cells, created in the porous ceramic bodies, is directly proportional to the volume of the pore formers initially included in the consolidated mixtures. In all cases, the volume is reduced but only by the shrink factor associated with sintering which also affects all other dimensions of the porous ceramic body in comparison to the corresponding green body before sintering. Also, another factor that appears to remain consistent throughout those samples is that the shape of the pores is predominantly round. That is to say that more than 50% of the pores have a rounded shape generally approaching the shape of a hollow cylindrical section, as distinguished from being polyhedral in shape while a substantial (more than 25%) additional portion of those pores which are not rounded in shape, are generally oval or elliptical in cross section, as distinguished from having distinct polygon cross sections. Relatively few of the pores, in comparison, are generally irregular in shape such that distinct polyhedrons are formed thereby.

Several samples, similar to the foregoing samples, but which were not tested with molten metal, were tested to determine strength. Two specific types of standard tests were performed to determine, respectively, Modulus of Rupture (MOR) and Modulus of Bending (MOB). At room temperature, the samples tested all exhibited an MOR within the range of 200–260 psi, and at elevated temperature (1200° F.) an MOR within the range of 110–160 psi. At room temperature, the samples tested all exhibited an MOB within the range of $5.5 \times 10^4$–$7.2 \times 10^4$ psi, and at elevated temperature (1200° F.) an MOB within the range of $4.2 \times 10^4$–$4.7 \times 10^4$ psi. All of the samples so tested for strength were fabricated according to the method stated in Example 5 above except that the volume percent of the ceramic powder used to form the ceramic plus resin mixture was 45 vol. % and the volume percent of the wax pore formers used to form the overall mixture, including pore formers plus ceramic plus resin was 75 vol. %. Based on the foregoing, the conclusion reached was that the porous ceramic bodies of the present invention had sufficiently high enough structural strength and integrity to qualify them as acceptable molten metal filters.

Figure 3:
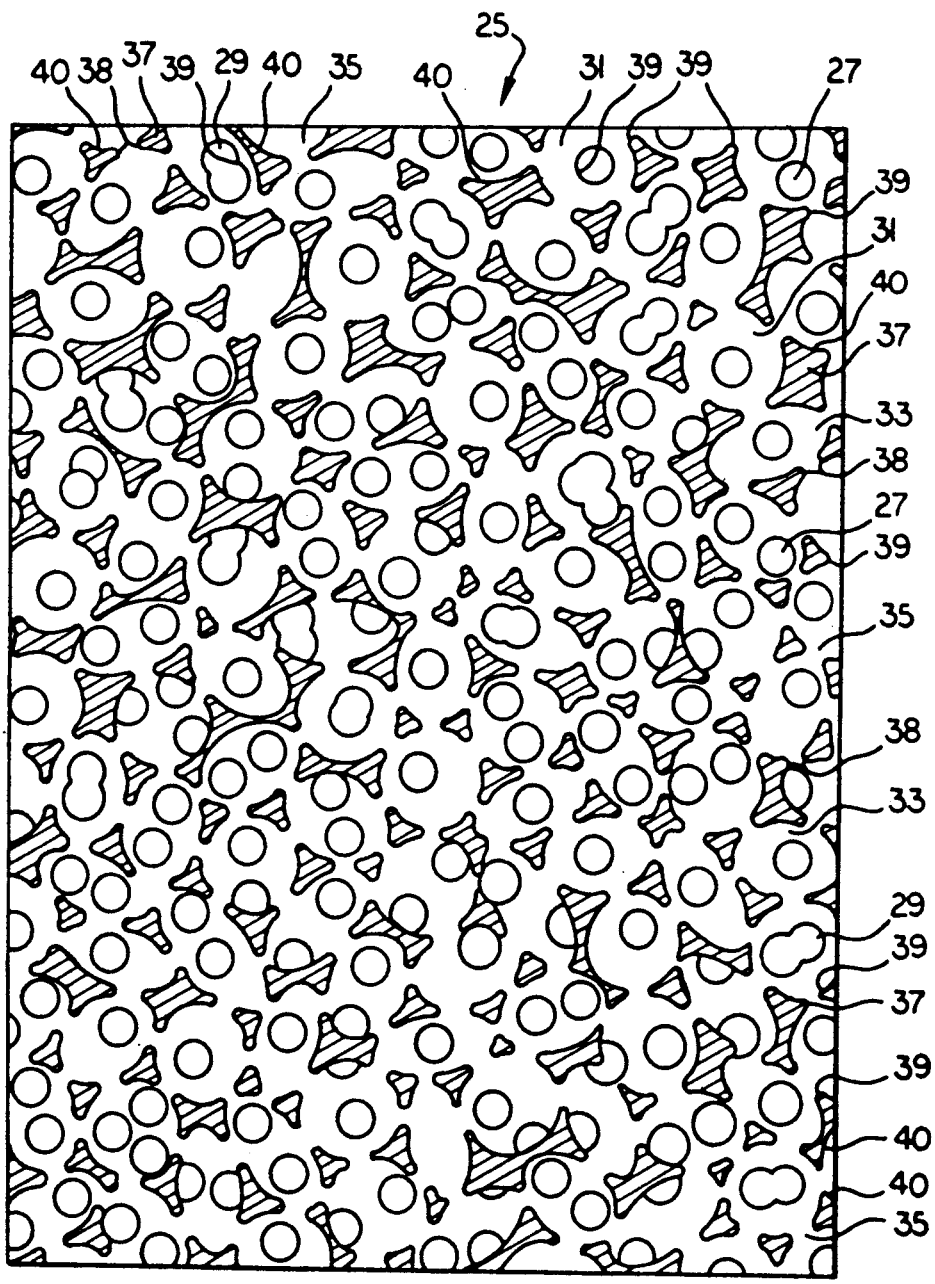
FIG. 3 is a schematic representation of a micrograph of a cross-section of the preferred embodiment of the present invention.

Referring to FIG. 3, there is shown a schematic representation of a micrograph of a cross section of a porous ceramic body 25 made using $Al_2O_3$ as the ceramic material and wax as the pore former. The degree of assimilated magnification relative to actual size is about 6×. Pores 27, seen as voids in their top view alignment shown in FIG. 3, are predominantly round in shape while some tend toward being elliptical or oval shaped pores 29. In this embodiment, generally spherically shaped wax pore formers are used, thus many of the cells 31 are spherical in shape while others take the form of squashed spherical cells 33 as explained previously. Generally horizontally arranged pores 35 interconnect the cells 31, 33. Substantially all of the cells are interconnected to at least two (2) other cells. Also, the top view pores 27, 29 interconnect cells beneath (not shown) to those that are shown in FIG. 3. Finally, separating the cells is a dense, substantially solid (void-free) sintered ceramic matrix 37 which, except for the interconnection of the pores 27, 29, 35, substantially completely fills the interstices between the cells 31, 33. This ceramic matrix 37 is depicted by the hatched sections of FIG. 3.

In FIG. 3, substantially all of the pore edges 39 which form the discrete areas where there is a transition from a cell wall 40 to a pore wall 38 are rounded off or smoothed such that there are no sharp corners or rough edges to cause the smooth flow of molten metal to be hindered or restricted. Surprisingly, however, the exogenous intermetallic substances, and other impurities including slag and dross, are trapped within the cells 31 and 33 during the flow of molten metal through the ceramic body 25 with relatively insubstantial amounts passing therethrough. Those exogenous intermetallic substances were found to be trapped substantially uniformly within the cells 31 and 33. Thus, those non-metallic substances were found to be substantially uniformly distributed through the cross section or thickness 13 of the ceramic body 11 as viewed in FIG. 2 extending from entry face 21 to exit face 23 whereas, in most prior art filter media, the exogenous intermetallic substances, after molten metal flow, are found to be collected at or close to the entry face thereof."

Figure 5:
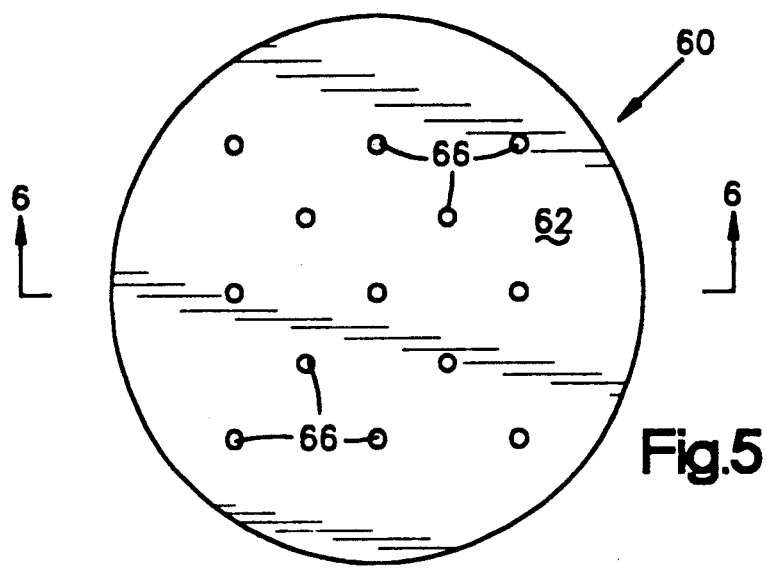
FIG. 5 is a schematic plan view of an alternative embodiment of a molten metal filter according to the invention especially adapted for the filtration of molten ferrous metal.
Figure 6:
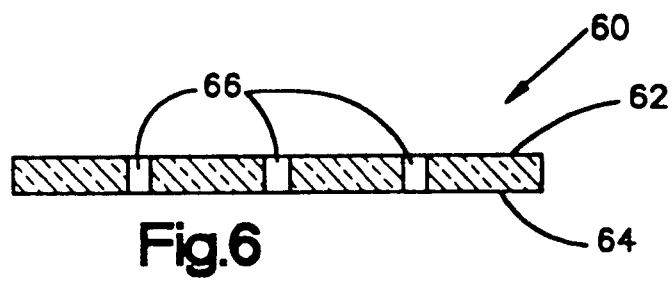
FIG. 6 is a cross-sectional view of the filter of FIG. 5, taken along a plane indicated by line 6—6 in FIG. 5.

Referring to FIGS. 5 and 6, a filter 60 is disc-like in configuration and includes a flat upper surface 62 and a flat lower surface 64 that is parallel to the surface 62. A preferred composition is the so-called ZTA filter that includes about 80% by weight of alumina ($Al_2O_3$) and about 20% by weight of yttrium oxide-stabilized zirconia (partially stabilized zirconia). Alternatively, the filter 10 could be comprised of substantially 100% alumina with about 0.6% by weight of magnesium sulphate as a sintering aid. Other possible filter materials include AlN, SiAlON, $Si_3N_4$, $ZrO_2$ (partially stabilized zirconia), $MgAl_2O_4$, zirconia-toughened mullite, SiC, $Si_3N_4$/SiC, and composites such as alumino-silicate fibers in a ceramic oxide matrix. Regardless of the materials from which the filter 60 is made, the resultant structure is a porous ceramic body having a plurality of interconnected cells that form a circuitous and tortuous path for the passage of molten metal.

The filter 60 includes a plurality of cylindrical through openings 66 that extend through the filter 60. The openings 18 can be drilled in a finished, fired filter 60, but it is preferred that they be formed during an initial press-forming operation by means of pins projecting into the cavity defined by the mold. The filter 60 also can be extruded as a cylinder which then can be cut into discs. The openings 66 then can be drilled. In this extruded version, it is expected that a water jet would be used to cut the discs and drill the openings. The openings 66 preferably have an inner diameter of 5 mm in unfired form. After the filter 60 has been sintered, the openings 18 shrink in diameter to approximately 4 mm.

As illustrated in FIGS. 5 and 6, the filter 60 is approximately 18 mm thick, and 57 mm in diameter. The openings 66 are spaced in a regular, generally rectangular array of five rows in a three-two-three-two-three arrangement. The center-to-center spacing of the openings 66 is approximately 13 mm. The openings 66 are positioned no closer than about 10 mm to the edge of the filter body. If desired, the spacing of the openings 66 can be decreased by increasing the number of openings 66 formed in the filter 60.

Figure 7:
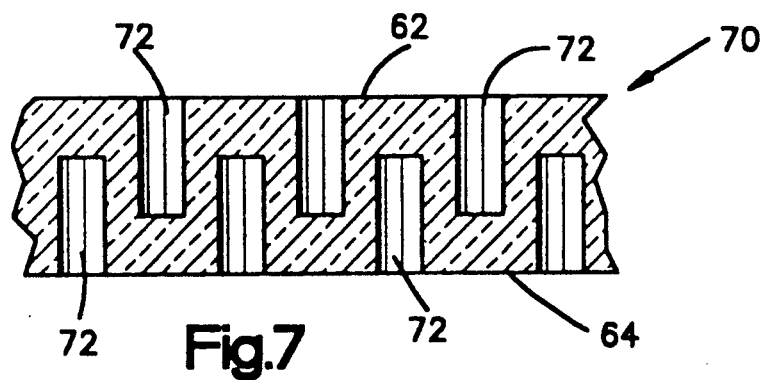
FIG. 7 is an enlarged schematic representation of a portion of an alternative embodiment of the invention.

Referring now to FIG. 7, an alternative embodiment of the invention is identified by the reference numeral 70. The filter 70 is substantially similar to the filter 60, and like reference numerals will be used where appropriate. In all of the embodiments described herein, the materials from which the filters are made are described in the Filter Patent, and preferred materials are those that have been described previously herein.

The filter 70 includes a plurality of openings 72 that extend only partially through the filter 70. The openings 72 extend approximately 66% of the way through the filter 70 as measured by the distance from the upper surface 62 to the lower surface 64. It is expected that the openings 72 could be formed within the range of about 50-99% of the distance through the filter 70. As can be seen in FIG. 7, openings 72 extend into the filter 70 from the upper surface 62 as well as the lower surface 64. The openings 72 are arranged relative to each other so that the structural integrity of the filter 70 is maintained. In unfired form, the diameter of the openings 72 is about 3 mm, while their diameter in fired form is about 2.2 mm. Both the in-row and between-row spacing of the centerlines of the openings 72 is about 8 mm.

Figure 8:
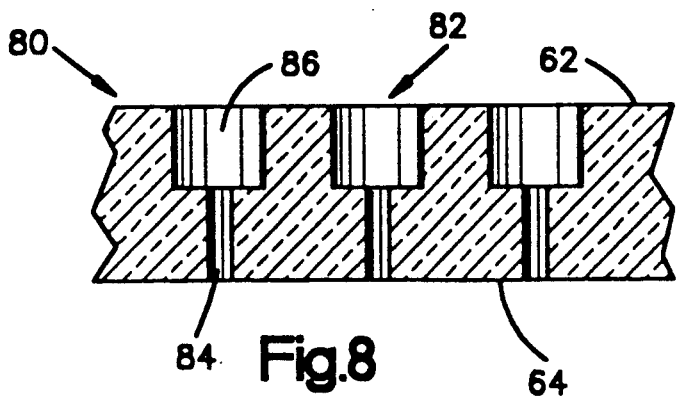
FIG. 8 is a view similar to FIG. 7 showing counterbored through openings formed in a filter body.

Referring to FIG. 8, an alternative embodiment of the invention is indicated by the reference numeral 80. The filter 80 is substantially similar to the filters 60, 70, but counterbored through openings 82 are formed therein. Each of the openings 82 includes a small-diameter portion 84 that opens through the lower surface 64, and a large-diameter portion 86 that opens through the upper surface 62.

Referring to FIG. 9, an alternative embodiment of the invention is indicated by the reference numeral 90. The filter 90 is substantially similar to the filters 60, 70, 80 described previously. Rather than provide through openings as in the filters 60, 80, or forming cylindrical openings 72 as in the filter 70, the filter 90 includes a waffle-type array of depressions 92 formed in both the upper and lower surfaces 62, 64. The depressions 92 are generally in the form of rectangular prisms.

Referring to FIG. 10, an alternative embodiment of the invention is indicated by the reference numeral 100. Unlike the filters 60, 70, 80, 90 that have generally flat upper and lower surfaces 62, 64, the filter 100 includes a plurality of corrugations 102 that define its upper and lower surfaces. Each of the corrugations 102 includes generally parallel, sharp-edged ridges 104 that are separated by generally parallel, sharp-edged troughs 106. The ridges 104 and troughs 106 are separated by straight-sided segments 108. As with the filters 70, 90, the filter 100 does not include any through openings. The filters 70, 90, 100 have enhanced surface area for contacting molten metal, but the structural integrity of the filter is preserved.

With particular reference to the filters 90, 100, the enhanced surface area increases the so-called "cake" filtration. Cake filtration results from a build-up of deposits that themselves act as a filter. The interior portions of the filters 90, 100, act as do the filters 60, 70 to provide filtration as a result of the tortuous passageways disposed therein.

Referring to FIG. 11, an alternative embodiment of the invention is indicated by the reference numeral 110. The filter 110 consists of several disc-like filters 112 that are positioned in tandem with respect to each other. Each of the filters 112 is substantially identical to the filter 60 described previously, with the exception that the filters 112 can be about one-third the thickness of the filter 60. That is, the assembled filter 110 in preferred form is about 18 mm thick, and each of the filters 112 is about 6 mm thick. The filters 112 contain through openings 66 that are substantially identical to the openings 66 described with respect to the filter 60. As will be apparent from an examination of FIG. 11, the openings 66 are arranged such that no continuous, straight-line opening exists through the filter 110.

It is preferred that three filters 112 be used, as illustrated. However, it is possible that two filters 112, or four or more filters 112 could be used, if desired. It also is possible to manufacture the filters 112 out of different materials. For example, the uppermost filter 112 could be made of ZTA, while the lower filters could be made of alumina. The uppermost filter 112 thus would provide more effective thermal shock resistance to molten ferrous metal, while the lower filters 112 would be less expensive.

Referring to FIG. 12, an alternative embodiment of the invention is indicated by the reference numeral 120. The filter 120 is identical to the filter 110, except that the filters 112 are spaced. The spacing between adjacent filters 112 is indicated by the reference numeral 122. The spacing 122 should be on the order of 0.5 to 10 times the diameter of the openings 66. The filter 120 is less desirable than the filter 110 because the space left between adjacent filters 112 can create a problem as regards the strength of the filters 112, and it may create a dead zone wherein molten metal possibly may freeze.

Operation

In operation, after a filter according to the invention has been positioned within a molten metal conduit, such that the cross-section of the conduit is completely covered by the filter, molten ferrous metal is passed through the conduit so that it encounters the upper surface and flows through the filter for discharge through the lower surface. With particular reference to the filter 60, it is believed that the molten metal during its passage through the filter 60 flows back and forth between the openings 66 and the openings (or pores) formed in the filter 60 itself. It also is possible for molten metal to flow directly through the openings 66 without flowing through the porous filter body. It has been found that the surface of the openings 66 provides a chemical affinity for inclusions that are entrained in the molten metal flowing through the filter 60. Accordingly, not only are inclusions mechanically trapped during their passage through the filter 60, but they also are chemically attracted by the filter 60.

In contrast with prior filters such as those disclosed in the '235 patent that are intended to filter molten aluminum, the filter according to the invention has several distinct advantages. In the present invention, attachment of inclusions is promoted by the filter geometry by creating areas where the flow is modified. Flow modification is achieved by creating eddies along the trailing edge of the filter cell wall 40 and by blocking the flow of molten ferrous metal with the front surface of cell wall 40. As the inclusions come in contact with the front surface and trailing edge of cell wall 40, they become attached and are believed to be sintered to the cell wall 40. This phenomenon is believed to be due to the reduced velocity in the regions of the front surface and trailing edge of cell wall 40. Hence, a greater portion of the filter can participate in the filtration process as opposed to such filters as extruded honeycombs. Such a filtration process is a typical characteristic for ferrous alloys and is distinctly different from the filtration process in aluminum, where the operating temperature is too low for alumina inclusions to sinter to the filter surface.

Additionally, as certain pores or channels get blocked by the capture of inclusions, alternate pathways are made available for the metal flow, thus permitting a greater volume of the filter to participate in the filtration process. As a result, improved efficiency can be achieved at high flow rates. In addition, the filter can process a greater quantity of metal before it becomes completely plugged. High flow pathways can be obtained by a variety of techniques previously disclosed, i.e., through openings, counterbored openings, and openings extending partially through the filter.

Tests have been conducted with the filter 60 using 1010 carbon steel, 1020 carbon steel, 1035 carbon steel, and iron. Flux for the steel was within the range of 1.7–2.5 lb/in.$^2$-sec. For iron the flux was within the range of 1.2–1.8 lb/in.$^2$-sec.

It has been found that the flux of the filter and the efficiency of the filter are related to each other. That is, an increase in flux results in a decrease in efficiency. It also is important, as noted previously, to maintain adequate strength characteristics for the filter. The filter 60 when tested at the referenced flux on steel showed an efficiency within the range of 30–60% as measured by the oxygen content test. The filter 110 displayed an efficiency of 38.2%. The oxygen content test indirectly tests for the removal of inclusions by calculating the amount of oxygen contained in the molten metal upstream of the filter, and comparing that value with the oxygen content of the molten metal downstream of the filter. This test is effective for aluminum-killed steel, because aluminum combines with oxygen in the steel to form alumina inclusions. Accordingly, a comparison of upstream and downstream oxygen content provides a measure of how much alumina has been removed by the filter.

The efficiency of 30–60% attributable to the present invention for a range of flux of 1.7–2.5 lb/in.$^2$-sec. is a considerable improvement over prior filters such as a die-extruded monolithic filter that is commercially available. The commercially available monolithic filter displays only a 20–40% efficiency at a greatly reduced flux of 1.2–1.5 lb/in.$^2$-sec.

An additional and unexpected advantage demonstrated by the present invention is that freeze-up problems in the filtration of molten ferrous metals are avoided. The filter according to the invention is heated quickly by the passage of molten metal through the high flow regions (openings in the filter) so that freezing is avoided. This is necessary to insure that the casting is completely filled. If the metal moves too slowly through the filter and if the filter is not preheated, heat loss may be too great to avoid freezing. This becomes critical when the superheat is fairly low, that is, about 10°–50° C. It is desirable to keep the superheat as low as possible in order to minimize the oxidation of reactive elements, refractory wear, electrical costs, and so forth. Because filters according to the invention can avoid freeze-up at low superheat, they have a distinct advantage over prior filters.

Although the invention has been described in its preferred embodiment with a certain degree of particularity, it will be appreciated that various changes and modifications can be made without departing from the true spirit and scope of the invention as hereinafter claimed. It is intended that the patent shall cover by suitable expression in the appended claims whatever features of patentable novelty exist in the invention disclosed.

What is claimed is:

1. A filter for filtering molten ferrous metal, comprising:
    a porous ceramic body including pores that define tortuous passageways therethrough, the body having first and second surfaces; and
    openings formed in the body, the openings being distinct from the pores, the openings opening through the first surface, extending through the body towards the second surface, and opening through the second surface.

2. The filter of claim 1, wherein the openings are cylindrical.

3. The filter of claim 1, wherein the openings are counterbored, with the larger portion of the counterbored opening extending through the first surface.

4. The filter of claim 1, wherein the openings are cylindrical with a diameter of about 4 mm.

5. The filter of claim 4, wherein the centerline-to-centerline distance between adjacent openings is about 13 mm.

6. The filter of claim 5, wherein the openings are spaced in a regular, generally rectangular array.

7. The filter of claim 1, wherein the distance between the first and lower surfaces is about 18 mm.

8. The filter of claim 1, wherein the body is formed largely of alumina.

9. The filter of claim 8, wherein the body includes about 80% by weight of alumina, and about 20% by weight of partially stabilized zirconia.

10. The filter of claim 9, wherein the body is formed substantially of alumina with about 0.6% by weight of magnesium sulfate as a sintering aid.

11. A filter for filtering molten ferrous metal, comprising:
a plurality of separate porous ceramic bodies, each body having pores that define tortuous passageways therethrough as well as first and second opposed surfaces, the bodies being disposed adjacent each other with the first and second surfaces of the bodies lying in generally parallel planes; and
openings formed in the bodies, the openings being distinct from the pores, the openings opening through the first surface of each body, extending through the body towards the second surface, and opening through the second surface.

12. The filter of claim 11, wherein the bodies are in contact with each other.

13. The filter of claim 11, wherein the openings have a nominal diameter designated "d", and the space between adjacent bodies is within the range of 0.5–10.0(d).

14. The filter of claim 11, wherein one of the bodies is formed of about 80% by weight alumina and about 20% by weight of partially stabilized zirconia, and another of the bodies is formed substantially of alumina.

15. The filter of claim 11, wherein two bodies are provided.

16. The filter of claim 11, wherein at least three bodies are provided.

17. The filter of claim 16, wherein each body is about 6 mm thick, and the total filter thickness is about 18 mm.

18. The filter of claim 11, wherein the openings in each body are maintained out of alignment with the openings in adjacent bodies such that no continuous opening extends through the bodies.

* * * * *